United States Patent [19]
Moriwake et al.

[11] Patent Number: 5,426,467
[45] Date of Patent: Jun. 20, 1995

[54] VIDEO SPECIAL EFFECT PROCESSOR

[75] Inventors: Katsuakira Moriwake; Kazuhiro Maruyama, both of Kanagawa, Japan

[73] Assignee: Sony Corporation, Tokyo, Japan

[21] Appl. No.: 93,439

[22] Filed: Jul. 16, 1993

Related U.S. Application Data

[63] Continuation of Ser. No. 798,153, Nov. 26, 1991.

[30] Foreign Application Priority Data

Nov. 30, 1990 [JP] Japan .................... 2-329623

[51] Int. Cl.⁶ .................... H04N 9/74; H04N 5/265
[52] U.S. Cl. .................... 348/584; 348/585
[58] Field of Search .............. 358/181, 183, 182, 186, 358/22, 160; 382/49; H04N 5/268, 5/242, 9/74, 5/265, 5/272; 348/578, 584, 586, 590, 598, 571

[56] References Cited

U.S. PATENT DOCUMENTS

| | | | |
|---|---|---|---|
| 4,360,831 | 11/1982 | Kella | 348/585 |
| 4,758,892 | 7/1988 | Bloomfield | 358/22 |
| 4,853,784 | 8/1989 | Jackson et al. | |
| 4,947,257 | 8/1990 | Fernandez et al. | 348/585 |
| 4,965,670 | 10/1990 | Klinefelter | 358/183 |
| 5,027,213 | 6/1991 | Kamin | 358/183 |
| 5,077,608 | 12/1991 | Dubner | 358/22 |
| 5,227,863 | 7/1993 | Bilbrey et al. | 348/585 |

FOREIGN PATENT DOCUMENTS

| | | | |
|---|---|---|---|
| 0260998 | 3/1988 | European Pat. Off. | |
| 0264964 | 4/1988 | European Pat. Off. | |
| 1131539 | 10/1968 | United Kingdom | |
| 1495344 | 12/1977 | United Kingdom | |
| 2155729 | 9/1985 | United Kingdom | 358/183 |
| 2227903 | 8/1990 | United Kingdom | |
| 2245794 | 1/1992 | United Kingdom | |

*Primary Examiner*—James J. Groody
*Assistant Examiner*—Michael H. Lee
*Attorney, Agent, or Firm*—William S. Frommer; Alvin Sinderbrand

[57] ABSTRACT

In a video special effect processor for performing video special effect processing on a digital video signal, a digital video signal is transmitted as serial digital data in a predetermined format, and data indicative of depth information of the digital video signal is transmitted in the form of serial data that conforms to the above-mentioned format.

7 Claims, 2 Drawing Sheets

VIDEO SPECIAL EFFECT PROCESSOR

This application is a continuation of application Ser. No. 07/798,153, filed Nov. 26, 1991.

BACKGROUND OF THE INVENTION

1. Field of the Invention

This invention relates to a video special effect processor for performing video special effect processing on a digital video signal, and more particularly to a video special effect processor for performing video special effect processing on a digital video signal by using depth information.

2. Description of the Prior Art

In preparing television broadcasting programs or video software, etc., a video special effect processor, e.g., as shown in U.S. Pat. No. 4,954,898, is sometimes used. Further, in using video special effect processors of this kind, there are instances in which it is required to synthesize a plurality of images to form a single image. In order to provide such a special effect with synthesis of an image, there is carried out a process such that depth information is added, e.g., to each respective pixel to allow comparison between values of the depth information for pixels corresponding to a plurality of images to be synthesized so that only pixels toward the foreground are displayed and deeper pixels are concealed. In addition, for the purpose Of realizing various special effects, the above-mentioned depth information (which will hereinafter also be called z information) is used.

For example, FIG. 1A shows a display content of a first image, wherein a circle 1 is arranged at a depth position $z_1$ closest to the screen, and a rectangle 2 is arranged at a depth position $z_2$ remotest from the screen. On the other hand, FIG. 1B shows a display content of a second image, wherein a triangle 3 is arranged at an intermediate depth position $z_3$. When such an arrangement of images is assumed, the dimensional relationship of respective depth positions is expressed as follows:

$$z_1 < z_3 < z_2$$

In order to synthesize these two images FIGS, 1A and 1B to provide an image as indicated by FIG. 1C, a hidden portion process corresponding to the respective depth positions $z_1$, $z_2$ and $z_3$ is required. In actual terms, at the portion where the circle 1 of the image FIG. 1A and the triangle 3 of the image FIG. 1B overlap with each other, the circle 1 is displayed and the triangle 3 is concealed or masked because the relationship $z_1 < z_3$ holds. On the other hand, and at the portion where the rectangle 2 of the image FIG. 1A and the triangle 3 of the image FIG. 18 overlap with each other, the rectangle 2 is concealed or masked and the triangle 3 is displayed because the relationship $z_2 > z_3$ holds. It is to be noted that while, for brevity of explanation in FIGS. 1A to 1C, respective shapes 1, 2 and 3 are taken as plane figures in parallel to the screen, i.e., depth positions at all points within the respective shapes are assumed to be equal to each other, depth information is given in practice for each respective pixel of the images.

Meanwhile, although it is possible to transmit the depth information as a parallel digital signal, in such a case, because the depth information is, e.g., several tens of bits per pixel, an exclusive multicore cable is required. Further, an exclusive matrix switcher is required in order to carry out switching between such signals. As a result, the entire system configuration becomes undesirably complicated.

OBJECT AND SUMMARY OF THE INVENTION

An object of this invention is to provide a video special effect processor in which the configuration of the transmitting means for transmitting depth information indicative of a position in a depth direction of a digital video signal is permitted to be simplified.

To attain the above-mentioned object of this invention, in accordance with this invention, there is provided a video special effect processor for performing video special effect processing on a digital video signal, which comprises first image processing means for outputting a first serial digital video signal in a predetermined format and data indicative of depth information for the first serial digital video signal in the form of serial data that conforms to the predetermined format, second image processing means for outputting a second serial digital video signal in the predetermined format and data indicative of depth information for the second serial digital video signal in the form of serial data that conforms to the predetermined format, and synthesis means supplied with an output signal from the first image processing means and an output signal from the second image processing means to synthesize the first and second serial digital video signals on the basis of the data indicative of depth information for the first digital video signal and the data indicative of depth information for the second serial digital video signal.

DETAILED DESCRIPTION OF THE PREFERRED EMBODIMENTS

Figure 2:
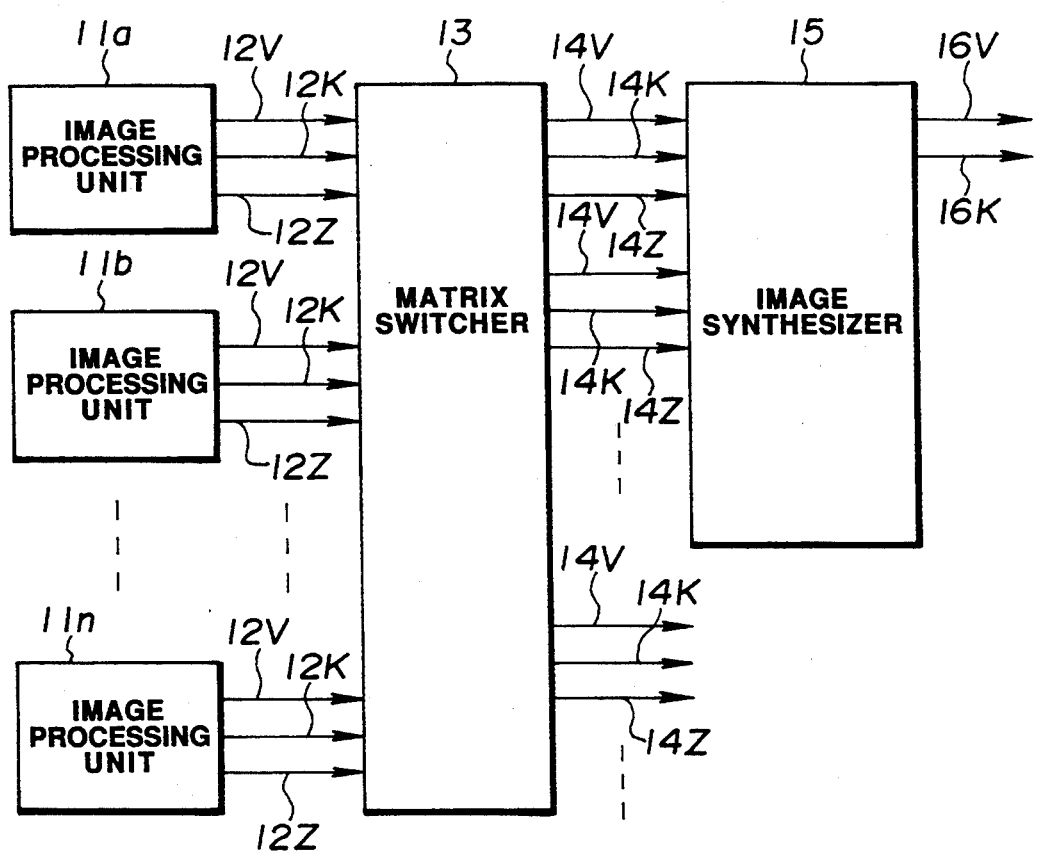
FIG. 2 is a block diagram showing an embodiment of a video special effect processor in accordance with the invention.

FIG. 2 is a circuit diagram showing in a block form an embodiment of a video special effect processor according to this invention.

In FIG. 2, a plurality of image processing units, e.g., n image processing units $11a$ to $11n$, are digital image processing units such as so called digital multieffectors, etc. These units serve to output the above-mentioned depth information (z information) along with respective digital video signals. More specifically, each of the image processing units $11a$ to $11n$ respectively outputs digital video signals that may be digital component video signals in the so-called D1 format, so-called key signals for switching images and the above-mentioned depth information. The digital video signal is such that the luminance (Y) signal has a data rate of 10 bits at a sampling frequency of 13.5 MHz and two color difference (B-Y, R-Y) signals each have a data rate of 10 bits at a sampling frequency of 6.75 MHz. The total data rate for serial transmission is therefore 270 Mbps. These serial video signals are transmitted through transmission lines 12V in accordance with predetermined standards. The key signal has the same sampling rate as that of the above-mentioned luminance signal. If one sample is, e.g., 10 bits, the serial transmission rate is 135 Mbps. Such key signals are transmitted through transmission lines 12K each using a coaxial cable according to the same standards as those for the video signal transmission cable. The above-mentioned depth information has a sampling rate of 13.5 MHz which is the same as that of the luminance signal. If one sample is, e.g., 20 bits (the original z information is 19 bits and 1 bit is added thereto), the serial transmission rate is 270 Mbps. This transmission rate is equal to the transmission rate of the video signal. This means that such depth information can be transmitted by way a video signal transmission line 12V. Accordingly, such depth information are transmitted by using transmission lines 12Z each using a coaxial cable according to the same standards as those for the transmission line 12V. Namely, three transmission lines 12V, 12K and 12Z connected each of the respective image processing units 11a to 11n, are constituted transmission cables, i.e. coaxial cables, meeting the same standards as those conventionally used for carrying out serial transmission of a video signal in the so-called D1 format.

Video signals, key signals and depth information transmitted through the transmission lines 12V, 12K and 12Z respectively connected to the image processing units 11a to 11n are delivered to, e.g., a digital matrix switcher 13, at which switching selection of the transmission route (so-called routing) is carried out. The routed signals are provided as outputs by matrix switcher 13. The matrix switcher 13 arbitrarily switches a plurality of inputs to output a plurality of outputs in a distributed manner. For this purpose, the conventional device for carrying out routing control of a video signal in the so-called D1 format may be used without modification Specifically, the matrix switcher 13 can be taken to be a switcher capable of effectively carrying out routing control of an input signal having a data rate up to the 270 Mbps without loss. As long as an input signal satisfies such a data rate, the matrix switcher is unaffected by whether that input signal is a video signal, a key signal or depth information. Accordingly, effective video signals, key signals and depth information are taken out from the respective output terminals of the matrix switcher 13, and are transmitted through transmission lines 14V, 14K and 14Z, respectively. Of course, coaxial cables which can be used for carrying out the serial transmission of a video signal in the so-called D1 format may be used for these transmission lines 14V, 14K and 14Z.

Figure 1A:
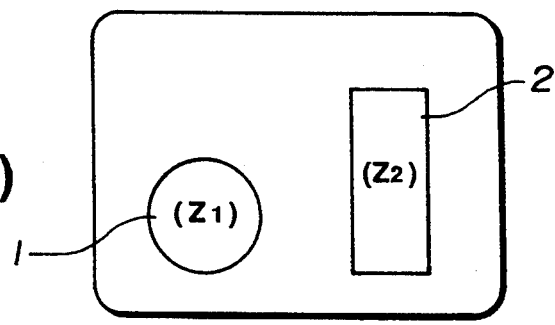
FIGS. 1A to 1C are schematic diagrams for explaining depth information for a video signal used in a video special effect processor.
Figure 1B:
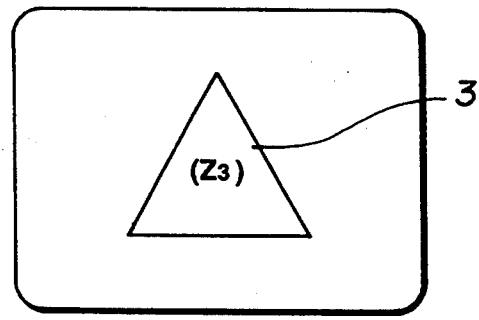
Figure 1C:
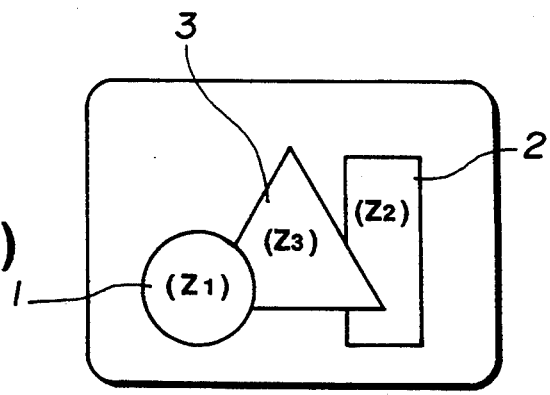

Then, several sets of video signals, key signals and depth information respectively transmitted through the transmission lines 14V, 14K and 14Z are sent to an image synthesizer (so-called combiner) 15, at which an image synthesis process as has been described with reference to FIG. 1 is executed on the basis of the depth information. The video signal for the synthesized image is taken out through a transmission line 16V, and the key signal is taken out through a transmission line 16K. Further, if depth information for each respective pixel of a synthesized image is required, such information may of course be taken out through a coaxial cable satisfying the standards for carrying out the serial transmission of a video signal in the so-called D1 format.

Accordingly, by employing such a configuration, it becomes unnecessary to provide a multi core cable exclusive for transmission of depth information, or the like. Further, equipment for a video signal in the so-called D1 format can be used without modification as a matrix switcher, etc. Thus, the system configuration can be significantly simplified. In addition, coaxial cables and/or equipment meeting the standards for the video signal used in this embodiment can be supplied at low cost based on mass-production.

It is to be noted that this invention is not limited to the above-described embodiment. For example, while an approach is adopted in the above-described embodiment to transmit the key signal and the depth information through individual transmission lines, if the key signal is assumed to be 8 bits and the depth information is assumed to be 12 bits (13.5 MHz in the both cases) so that the total bit rate falls within 270 Mbps, a single transmission line (coaxial cable meeting the so-called D1 format standards) may be used to transmit both the key signal and depth information. Further, while the above-described embodiment has been discussed only in connection with a digital video signal in the so-called D1 format, this invention is similarly applicable to the case of a digital composite video signal in the so-called D2 format. That is, in the latter case, there may be employed a system configuration in which a transmission line meeting the same standards as those for the line for serial transmission of a video signal is used to transmit depth information.

As is clear from the foregoing description, a video special effect processor according to this invention, a serial transmission line meeting the same standards as those for a serial transmission line through which a digital video signal is transmitted, e.g., a coaxial cable, is used to transmit depth information. Accordingly, it becomes unnecessary to provide e.g., a multi core exclusive cable or an exclusive matrix switcher, etc. for transmitting depth information. Thus, the entire signal transmission system is simplified, and relatively inexpensive cable and/or equipment can be used.

What is claimed is:

1. A video special effect processor for performing video special effect processing on a digital signal, comprising:

first image processing means for outputting a first output signal representing a first image comprised of respective pixels in a raster and that includes a first serial digital video signal comprised of data in a predetermined format representing said pixels and data indicative, pixel-by-pixel, of depth information for said respective pixels of said first image and being in the form of serial data that conforms to said predetermined format;

second image processing means for outputting a second output signal representing a second image comprised of respective pixels in a raster and that includes a second serial digital video signal comprised of data in said predetermined format representing said pixels of the second image and data indicative, pixel-by-pixel, of depth information for said respective pixels of said second image and being in the form of serial data that conforms to said predetermined format;

third image processing means for outputting a third output signal representing a third image comprised of respective pixels in a raster and that includes a third serial digital video signal comprised of data in said predetermined format representing said pixels of the third image and data indicative, pixel-by-pixel, of depth information for said respective pixels of said third image and being in the form of serial data that conforms to said predetermined format;

matrix switcher means receiving said first, second and third output signals for arbitrarily selecting and outputting at least two of said first, second and third output signals; and synthesis means receiving said at least two output signals selected and output by said matrix switcher means for synthesizing said serial digital video signals included in said at least two output signals on the basis of said data indicative, pixel-by-pixel, of depth information for the respective pixels of the images made up by the data of the serial digital video signals respectively included in said at least two output signals.

2. A video special effect processor as set forth in claim 1, wherein said predetermined format is the D-1 format.

3. A video special effect process processor as set forth in claim 1, wherein said predetermined format is the D-2 format.

4. A video special effect processor for performing video special effect processing on digital video signals, comprising:

at least three image processing means for outputting respective sets of video information signals, each of said sets including a serial digital video signal comprised of data representing pixels arranged in a raster to make up a respective image, a key signal and a depth data signal comprising serial data indicative, pixel-by-pixel, of depth information for the respective pixels making up said respective images;

matrix switcher means connected to said at least three image processing means for arbitrarily selecting and outputting at least two of said sets of video information signals output from said at least three image processing means; and synthesis means connected to said matrix switcher means for synthesizing the respective serial digital video signals included in said at least two selected sets of video information signals output from said matrix switcher means on the basis of the respective key signals and the depth data signals indicative, pixel-by-pixel, of the depth information for the respective pixels of the images made up by the data of the serial digital video signals respectively included in said at least two selected sets of video information signals.

5. A video special effect processor according to claim 4, wherein said serial digital video signals are in a predetermined format and said depth data signals are in a form that conforms to said predetermined format.

6. A video special effect processor according to claim 5, wherein said predetermined format is the D-1 format.

7. A video special effect processor according to claim 5, wherein said predetermined format is the D-2 format.

* * * * *